United States Patent [19]

Burgdorf et al.

[11] Patent Number: 4,715,486
[45] Date of Patent: Dec. 29, 1987

[54] LOW-WEAR FRICTIONALLY ENGAGING DEVICE

[75] Inventors: Jochen Burgdorf, Offenbach-Rumpenheim; Helmut Weisbrod, Nauheim, both of Fed. Rep. of Germany

[73] Assignee: International Standard Electric Corporation, New York, N.Y.

[21] Appl. No.: 290,117

[22] Filed: Aug. 5, 1981

[30] Foreign Application Priority Data

Sep. 30, 1980 [DE] Fed. Rep. of Germany ....... 3033139

[51] Int. Cl.$^4$ ................. F16D 13/60; F16D 65/02; F16D 69/02
[52] U.S. Cl. ..................... 192/107 M; 188/251 A; 188/251 M
[58] Field of Search ............... 192/107 M, 70.14; 188/251 A, 251 M; 75/231, 236, 237, 238, 239, 240, 241

[56] References Cited

U.S. PATENT DOCUMENTS

| 3,038,563 | 10/1956 | Boegehold ............... | 192/107 M |
| 3,042,168 | 7/1962 | Binder ..................... | 192/70.14 |
| 3,890,105 | 6/1975 | Weissmann et al. ...... | 75/236 |
| 3,967,037 | 6/1976 | Marzocchi et al. ........ | 192/107 M |
| 4,089,682 | 5/1978 | Saito et al. ............... | 75/236 |
| 4,091,904 | 5/1978 | Beyer ....................... | 192/107 M |
| 4,180,622 | 12/1979 | Burkhard et al. .......... | 192/107 M |
| 4,212,376 | 7/1980 | Enright et al. ............ | 188/218 XL |

Primary Examiner—Rodney H. Bonck
Attorney, Agent, or Firm—James B. Raden; Robert P. Seitter

[57] ABSTRACT

A frictionally engaging device, such as a disc brake, includes a first and a second friction element which engage one another as the device is operated to reduce the extent of and/or eliminate relative movement between these elements. The first element consists of an organically bonded friction material suffering relatively more pronounced wear, and the second element is made of a metallic material, especially iron, which suffers lesser wear in operation. The extent of wear of the first element is reduced by applying a coating of a particulate material, especially such deposited by high kinetic energy impacting of the particles, on the frictional surface of the second element which cooperates with the first element. The coating advantageously contains metals, such as cobalt, chromium and/or nickel, and/or metal carbides, especially those of tungsten and chromium.

8 Claims, 2 Drawing Figures

LOW-WEAR FRICTIONALLY ENGAGING DEVICE

BACKGROUND OF THE INVENTION

This invention relates to a device comprising a pair of engaging friction elements in general, and particularly to a friction brake or to a friction clutch, having a first friction element which consists of friction materials containing organic binding agents and which suffers a greater wear and a second friction element which suffers a lower wear and consists of iron material.

Friction devices such as friction brakes or friction clutches are used in order to reduce and eventually eliminate relative movement between two parts when in use. While accomplishing this purpose, they transform kinetic energy into heat, e.g. when braking a part in motion.

When used for braking a vehicle, the friction device used may be constructed as a disc brake arrangement consisting of a brake disc and of brake linings. The extent of wear of these cooperating elements will vary in dependence on the materials chosen for the elements frictionally engaging each other and will be influenced by various secondary factors such as the friction coefficients and behavior at different temperatures. Cast iron will e.g. be used as the material for the brake disc. The brake linings are generally made of organic-bonded friction materials which usually consist of organic binding agents such as cross-linked synthetic resins such as phenolic resins, and possibly of natural and synthetic caoutchouc as well as of fillers. The fillers used may be metal chips, metallic oxides and/or other mineral materials.

If the wear is kept down as far as possible, one will achieve either a longer life or small dimensions of the elements and thus a reduced weight of the device.

For the purpose of reduction of wear, arrangements have become known where a metallic braking element such as e.g. a brake disc is provided with a long-wear coating. A process for preparing such a coating is disclosed in the German published patent application DE-OS No. 21 66 949 according to which a long-wear frictional coating is applied to each of the elements by means of a plasma jet. In this process, particles of metal, an alloy, or a combination of metals and their compounds such as metallic oxides or metallic carbides are introduced into the plasma jet. The long-wear coating in this process must have the original crystallographic properties of the particles, i.e. a hexagonal crystal system. The materials used for the production of the two coatings of this type which are in frictional engagement with each other are required to be different; one of the coatings e.g. is made based on carbides while the other is produced on the basis of oxides.

In this known arrangement an important disadvantage is to be seen in the fact that both friction elements have to be provided with a coating.

It is further known to increase the wear resistance of the brake linings. This can be achieved e.g. by using metallic-bonded brake linings instead of organic-bonded brake linings. The metallic-bonded brake linings contain particles in a sintered metallic bond.

A further method of increasing the resistance to wear of the brake linings is disclosed in the German published patent application DE-OS No. 24 06 242. There, an electrostatic coating process is disclosed by means of which thin coatings of metallic mineral powder are produced which are firmly bonded to a metallic carrier plate.

In these two last-mentioned processes or arrangements, respectively, a particular disadvantage is to be seen in the fact that while there is indeed a wear reduction with regard to one of the friction elements, i.e. of the brake lining, the other friction element, that is the brake disc, will suffer a greater degree of wear. Thus, the small permissible extent of wear of the disc will soon be surpassed.

SUMMARY OF THE INVENTION

Accordingly, it is a general object of the present invention to avoid the disadvantages of the prior art.

More particularly, it is an object of the invention to provide a frictionally engaging device, particularly a braking device, which is not possessed of the disadvantages of the conventional devices of this type.

Still another object of the invention is to so construct the device of the type here under consideration that the degree of wear of that of the frictionally engaging elements which has heretofore suffered a more pronounced wear will be reduced while maintaining the degree of wear of the other element within predetermined relatively low limits.

It is yet another object of the present invention to come up with a combination of materials for the elements or for their engaging portions which will have properties comparable if not superior to the conventional material combinations, as far as the coefficient of friction and behavior at different temperatures are concerned.

A concomitant object of the invention is to develop a device of the above type and a method of manufacturing the same which are simple and inexpensive.

In pursuance of these objects and others which will become apparent hereafter, one feature of the present invention resides in a frictionally engaging device, especially a friction brake, friction clutch and the like which comprises, in combination, at least one first and at least one second friction element engageable with one another, said first element being of a relatively high-wear friction material containing an organic binder, said second element being of a relatively high-wear material containing iron and having at least one friction surface facing said first element; and a wear-reducing coating at least on said one friction surface, preferably of a material containing metals, non-metals, and chemical compounds of metals and non-metals.

It is advantageous to apply the coating material of the frictional coating in the form of particles to the friction surface at high kinetic energy.

With regard to the realization of this invention, it will be advantageous to produce the second friction element as a relatively inexpensive casting of grey cast iron or nodular cast iron, in that such materials can easily be shaped.

The use of metallic carbides of the metals tungsten and chromium, the use of such metals as cobalt chromium, and nickel, and the use of carbon have proved to be advantageous.

The obtained properties of the coating will vary, depending on the ingredients in the composition of the coating.

In the tests performed, coatings having the following composition proved particularly suitable:

Material A: 25% of WC; 5% of Ni; remainder: mixtures of W-Cr carbides.

Material B: 84.6% of WC; 7.5% of Co; 4.2 of Cr; 3.5% of C.

(All amounts in percentages by weight).

The high kinetic energy of the particles will advantageously be achieved by using the flame shock spraying process. Detonations will cause such an acceleration of the particles that, upon impinging on the friction surface to be coated, microbonding will take place between the particles of the coating and the friction surface material, and microclamping will occur between the materials of the friction surface and of the coating by means of plastic deformation of the top layers of the friction surface material, the depth of the plastic deformation varying. As compared with the results of plasma spraying, due to these reactions a considerably stronger adhesion of the coating to the backing material and a reduced porosity of the coating will be achieved in the flame-shock-sprayed coatings. Thus, the extreme requirements in particular with regard to adhesion, which are encountered during the operation of the brake or clutch, will be satisfied.

Owing to the fact that the thickness of the frictional coating lies within a range of only 0.02 to 0.03 millimeters, there will result a short coating time as well as an economical use of materials as far as the materials of the frictional coating are concerned.

Advantageous embodiments will be obtained by designing the device as a brake, in particular a disc brake, with the second friction element having the longer useful life being constructed as the rotating element, i.e. as the brake disc, and with the first friction element being constructed as a brake lining.

Surprisingly, one advantage achieved by this invention is that the wear-resistant frictional coating on the friction surfaces of the second friction element of iron material, i.e. of the disc brake, will cause a reduction in the extent of wear of the first friction element, consisting of friction materials with organic binding agents, by a factor of 3 to 4, i.e. the wear is considerably reduced as compared with a frictional action in which the same friction material rubs against an uncoated friction surface, while the coefficient of friction remains substantially the same.

The wear reduction at the brake linings thus will be achieved by coating the other friction element, i.e. the brake disc, according to the invention while leaving the brake lining uncoated.

After the frictional action, there is no wear at the brake disc itself. Thus, the life of this virtually abrasion-free brake disc approaches or even surpasses that of the vehicle.

In many disc brakes up to now, it has been impossible to avoid an uneven lining wear caused by increased abrasion at or by uneven wear of one brake lining. One feature of this invention lies in the fact that, according to the invention, this brake lining is facing the coated frictional surface of the brake disc, as a result of which the lives of the brake linings will be approximately the same.

Further, it will be of particular advantage to associate a brake lining which is dismountable with difficulties with the coated surface of the brake disc, inasmuch as in this way there will be less frequent need of expensive brake lining replacement jobs.

This concept of the present invention will further be realized in an advantageous way in that, in a floating-caliper disc brake, only that friction surface will be coated which cooperates with the brake lining actuated indirectly via the caliper. In a conventionally constructed floating-caliper disc brake there is very often encountered a more pronounced lining wear at the indirectly actuated brake lining due to the inexactness of clearance adjustments for this brake lining as well as due to influences of disc wobbling and/or caliper expansion which will cause the affected lining to engage the disc even when the brake is not operated. The coating of the invention will bring about a marked increase in the life of this lining; thus, a frequent premature replacement, which would be connected with complicated and expensive workshop jobs, will become superfluous.

The above-mentioned wear behavior makes it possible to construct disc brakes the brake discs of which are thinner by about 10% and where each of the brake linings may be thinner by up to 75%. Thus, a pronounced advantage of the invention is a reduction of the axial length of the entire brake arrangement of disc, linings, and caliper housing or, in other words, a reduction in requirements for availability of space within the wheel rim. This is accompanied by a reduction in the volume of brake fluid to be supplied, as well as by an important reduction in weight.

DETAILED DESCRIPTION OF THE PREFERRED EMBODIMENTS

Above-mentioned and other features and objects of this invention will become more apparent by reference to the following description taken in conjunction with the accompanying drawings, in which.

Figure 1:
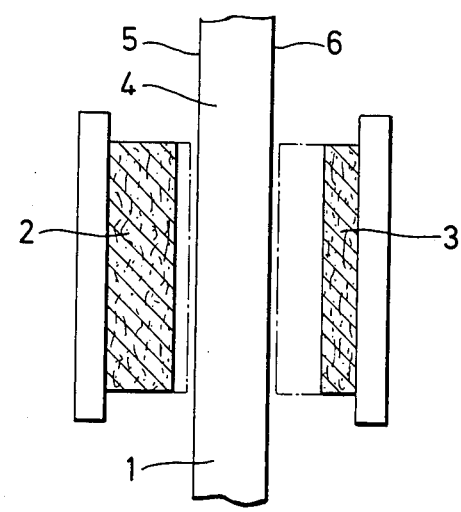
FIG. 1 is a diagrammatic view representing the measurements taken at the two brake linings after lining wear tests with a brake disc coated according to the invention on only one side.

Referring now to the drawing in detail, and first to FIG. 1, it may be seen that the reference numeral 1 has been used to identify an only diagramatically represented brake disc, the reference numeral 2, a brake lining which acts on a coated friction surface 5 of the brake disc 1 and the reference numeral 3, a brake lining which acts on an uncoated friction surface 6 of the disc 1.

The dash-dot lines indicate the thickness of the brake linings 2 and 3 when new. The hatched brake lining thickness will result after the termination of the wear tests. The axial thicknesses of the linings 2 and 3 and of the disc approximately reflect the test results.

The represented results were obtained under the following conditions:

The brake disc 1 coated according to the invention on friction surface 5, only, was tested for disc and lining wear in a disc brake arrangement under the simulation of the operating conditions of an intermediate class automobile.

From FIG. 1, it may be recognized that the lining wear of the brake lining 2 which cooperates with the coated friction surface 5 of the brake disc 1 which was coated according to the invention is clearly less, by approximately 70%, than the wear of brake lining 3 disposed at the opposite uncoated friction surface 6 of the brake disc 1.

The brake linings 2 and 3 consist of friction materials with organic binding agents and are from the same batch. The brake linings 2 and 3 selected were of a type considered agressive in respect of the disc wear.

The wear of the uncoated friction surface 6 of the brake disc 1, in this test, was within the range of 0.3 millimeters. In the same test, the wear of the friction surface 5 coated according to the invention was not measurable within the 1/100 millimeter range.

Figure 2:
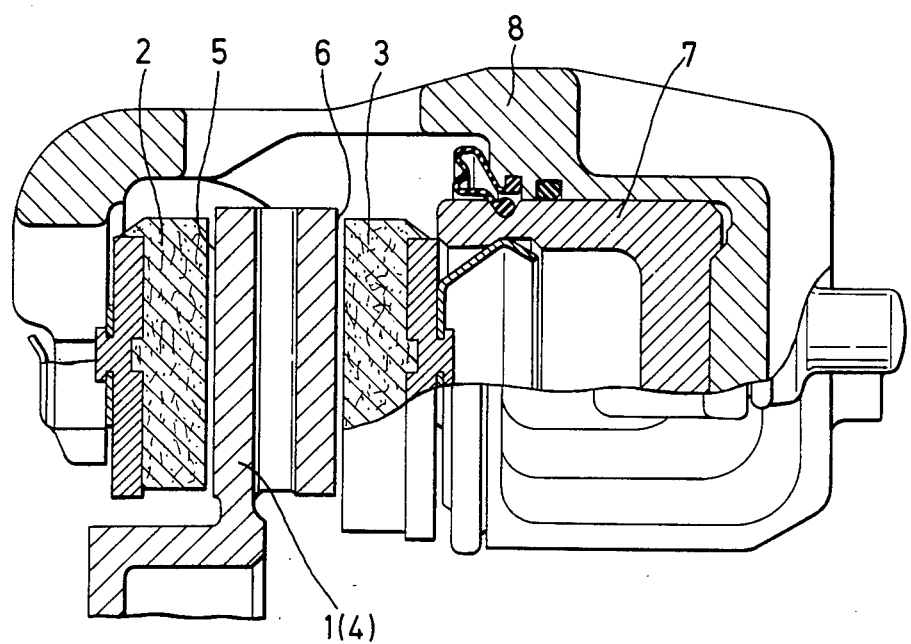
FIG. 2 is a partially sectioned side elevational view of a floating-caliper spot-type disc brake with a brake disc coated according to the invention on only one side.

A floating-caliper spot-type disc brake is shown in partial section in FIG. 2 where the same reference numerals as above have been used to indentify corresponding elements. A caliper 8 straddles the brake disc 1 in a U-shaped manner and has a hydraulically movable actuating piston 7 on one side of the brake disc 1. The actuating piston 7 will axially displace the associated brake lining 3. The brake lining 2 on the opposite side of the brake disc 1 will be moved indirectly via the caliper 8 which supports itself via its cylinder housing at the actuating piston 7. The reaction force after the application of the brake lining to the brake disc 1 will cause movement of the second brake lining 2 via a displacement of the caliper 8 in relation to the brake carrier and cause the second brake lining 2 to engage the brake disc 1 and thus effect braking. According to the invention, the friction surface 5 of the brake disc 1 is coated with the frictional coating. The friction surface 6 is uncoated. In particular, an inexact adjustment of the clearance as well as disc run-out and an expansion of the caliper 8 often cause the indirectly operated brake lining 2 to be exposed to faster wear, by contacting the brake disc 1, even when the brake is not applied, than the brake lining 3 acted upon by the actuating piston 7. The inventive coating of the friction surface 5 of the brake disc 1 will now effect a reduced wear of this brake lining 2 as compared with its wear when coacting with the friction surface 5 without coating, such reduction amounting to approximately 70%. Thus, one will achieve either a longer life of this brake lining 2, or a reduced axial constructional length of the entire arrangement and less space needs within the rim dish.

In applying the inventive basic idea to a disc brake, in particular to a floating-caliper disc brake, the following advantages will thus be achieved:

The life of the brake lining 2 subjected to the highest stress will be increased in an extraordinary manner; thus complicated replacement jobs at the brake disc will be avoided;

owing to the invention, the highly undesirable uneven wear of the brake lining 2 which lies on the outside will either be reduced considerably or eliminated entirely; this will enhance the functional and operational reliability of the entire disc brake;

the longer life of the brake lining 2 will enable the designer to dimension the brake line 2 shorter in the axial direction. This will mean that the entire axial extension of the brake disc will be shortened. A further shortening may be achieved by coating the friction surface 6 which lies on the opposite side of the disc and which cooperates with the directly actuated brake lining 3 in accordance with the invention as well. On the other hand, a short axial construction means a better accommodation of the unit consisting of disc brake, brake carrier, etc. in the narrow space available between wheel suspension and wheel dish of an automobile.

While we have described above the principles of our invention in connection with specific apparatus, it is to be clearly understood that this description is made only by way of example and not as a limitation to the scope of our invention as set forth in the accompanying claims.

We claim:

1. In a frictionally engaging device, especially a friction brake, friction clutch, and the like, a combination comprising at least one first and at least one second friction element engageable with one another for surface to surface engagement, said first element being of a relatively high-wear friction material containing an organic binder, said second element being of a relatively low-wear material containing iron and having at least one friction surface facing said first element for engagement therewith; and a wear-reducing coating uniformly applied to at least one friction surface of said second element, said coating comprising a substantial proportion of tungsten carbide.

2. The combination as defined in claim 1, wherein said coating comprises, by weight, 20 to 30% of tungsten carbide, 5% of nickel, and the remainder a mixture of tungsten-chromium carbides.

3. The combination as defined in claim 1, wherein said coating comprises, by weight, 80 to 90% of tungsten carbide, up to 10% of cobalt, up to 5% of chromium, and up to 5% of carbon.

4. The combination as defined in claim 1, wherein said coating has a thickness of up to 0.03 milimeters.

5. The combination as defined in claim 4, wherein said coating has a thickness in excess of 0.2 millimeters.

6. In a floating caliper vehicle disc brake having a brake disc of cast iron material, said disc including a first and a second braking surface, a first and a second brake lining member adapted to engage the respective braking surfaces of said disc in a frictional braking engagement, the linings comprised of organic bonded friction material, the improvement in which at least one of said braking surfaces bears a wear resistant coating comprised of at least 25% tungsten carbide by weight.

7. A floating caliper disc brake as claimed in claim 6, wherein said coating comprises, by weight, 20 to 30% of tungsten carbide, 5% of nickel, and the remainder a mixture of tungsten-chromium carbides.

8. A floating caliper disc brake as claimed in claim 6 wherein said coating comprises, by weight, 80 to 90% of tungsten carbide, up to 10% of cobalt, up to 5% of chromium, and up to 5% of carbon.

* * * * *